(12) United States Patent
Dusini

(10) Patent No.: US 12,486,712 B2
(45) Date of Patent: Dec. 2, 2025

(54) MOTOR VEHICLE

(71) Applicant: FERRARI S.p.A., Modena (IT)

(72) Inventor: Luca Dusini, Modena (IT)

(73) Assignee: FERRARI S.P.A., Modena (IT)

( * ) Notice: Subject to any disclaimer, the term of this patent is extended or adjusted under 35 U.S.C. 154(b) by 0 days.

(21) Appl. No.: 18/051,602

(22) Filed: Nov. 1, 2022

(65) Prior Publication Data

US 2023/0151673 A1 May 18, 2023

(30) Foreign Application Priority Data

Nov. 12, 2021 (IT) ........................ 102021000028820

(51) Int. Cl.
| | |
|---|---|
| *E05F 15/60* | (2015.01) |
| *B60R 25/24* | (2013.01) |
| *E05F 15/75* | (2015.01) |
| *E05B 85/10* | (2014.01) |

(52) U.S. Cl.
CPC .............. *E05F 15/75* (2015.01); *B60R 25/24* (2013.01); *E05F 15/60* (2015.01); *E05B 85/103* (2013.01); *E05Y 2201/434* (2013.01); *E05Y 2201/624* (2013.01); *E05Y 2400/40* (2013.01); *E05Y 2900/531* (2013.01)

(58) Field of Classification Search
CPC ......... E05F 15/616; E05F 15/77; E05F 15/60; B60R 25/24
See application file for complete search history.

(56) References Cited

U.S. PATENT DOCUMENTS

| | | | | |
|---|---|---|---|---|
| 6,401,392 | B1 * | 6/2002 | Yuge | E05F 15/619 |
| | | | | 49/354 |
| 9,382,741 | B2 * | 7/2016 | Konchan | E05B 81/14 |
| 9,797,181 | B2 * | 10/2017 | Wheeler | G07C 9/00944 |
| 10,087,671 | B2 * | 10/2018 | Linden | E05B 81/56 |
| 10,151,132 | B2 * | 12/2018 | Elie | B60Q 9/00 |
| 10,227,810 | B2 * | 3/2019 | Linden | E05B 81/70 |
| 10,287,815 | B2 * | 5/2019 | Kitamura | E05F 15/616 |
| 10,633,893 | B2 * | 4/2020 | Harajli | E05B 81/20 |
| 10,787,854 | B2 * | 9/2020 | Tsuboi | E05F 15/73 |

(Continued)

FOREIGN PATENT DOCUMENTS

| | | |
|---|---|---|
| DE | 102015107609 A1 | 11/2015 |
| WO | 2017034809 A1 | 3/2017 |

OTHER PUBLICATIONS

Italian Search Report for Application No. 102021000028820 completed Jun. 15, 2022.

*Primary Examiner* — Daniel J Troy
*Assistant Examiner* — Susan M. Heschel
(74) *Attorney, Agent, or Firm* — CANTOR COLBURN LLP

(57) ABSTRACT

A motor vehicle includes a body, a side door hinged to the body so that it can rotate about an axis towards a side of the motor vehicle between a closed configuration and an open configuration; a motorized opening device, which is controllable to move the door from the closed configuration towards the open configuration; command receiving means to receive an opening request command for the door from the outside of the motor vehicle; and a control unit (ECU) configured to control the opening device so that the door rotates from the closed configuration towards the open configuration in response to the opening request command.

8 Claims, 5 Drawing Sheets

(56) References Cited

U.S. PATENT DOCUMENTS

| | | | | |
|---|---|---|---|---|
| 11,008,780 | B2* | 5/2021 | Oxley | E05C 17/203 |
| 11,078,691 | B2* | 8/2021 | Salter | B60R 25/23 |
| 2015/0330133 | A1* | 11/2015 | Konchan | E05B 81/14 |
| | | | | 296/146.4 |
| 2018/0051502 | A1* | 2/2018 | Roos | E05B 81/06 |
| 2020/0217107 | A1 | 7/2020 | Harajli et al. | |

* cited by examiner

MOTOR VEHICLE

CROSS-REFERENCE TO RELATED APPLICATIONS

This patent application claims priority from Italian patent application no. 102021000028820 filed on Nov. 12, 2021, the entire disclosure of which is incorporated herein by reference.

TECHNICAL SECTOR

The invention relates to a motor vehicle, for example a sports car, and more specifically to a door thereof and to a relative door opening device.

PRIOR ART

As everybody knows, car doors are manually opened from the outside through a door handle, which usually also includes a manual control, for example a button or a lever, to unlock a lock of the door.

Generally speaking, known motor vehicles need to be improved, in particular by increasing door opening comfort, when the door has to be opened from the outside of the motor vehicle, though without jeopardizing the safety of the motor vehicle in case of theft and of the people or objects surrounding the motor vehicle.

The object of the invention is to fulfil the need discussed above, preferably in a simple and effective fashion.

DE102015107609A1 discloses an assembly for opening a vehicle door with an actuator body and an actuator shaft carried by the vehicle door. Further similar examples of assemblies for opening a vehicle door according to the prior art can be found in US2020/217107A1 and WO2017/034809A1.

DESCRIPTION OF THE INVENTION

Said object is reached by a motor vehicle as defined in claim 1.

The dependent claims define particular embodiments of the invention.

BRIEF DESCRIPTION OF THE DRAWINGS

Hereinafter, an embodiment of the invention will be described, in order to allow the latter to be better understood, by way of non-limiting example and with reference to the accompanying drawings, wherein.

EMBODIMENTS OF THE INVENTION

Figure 1:
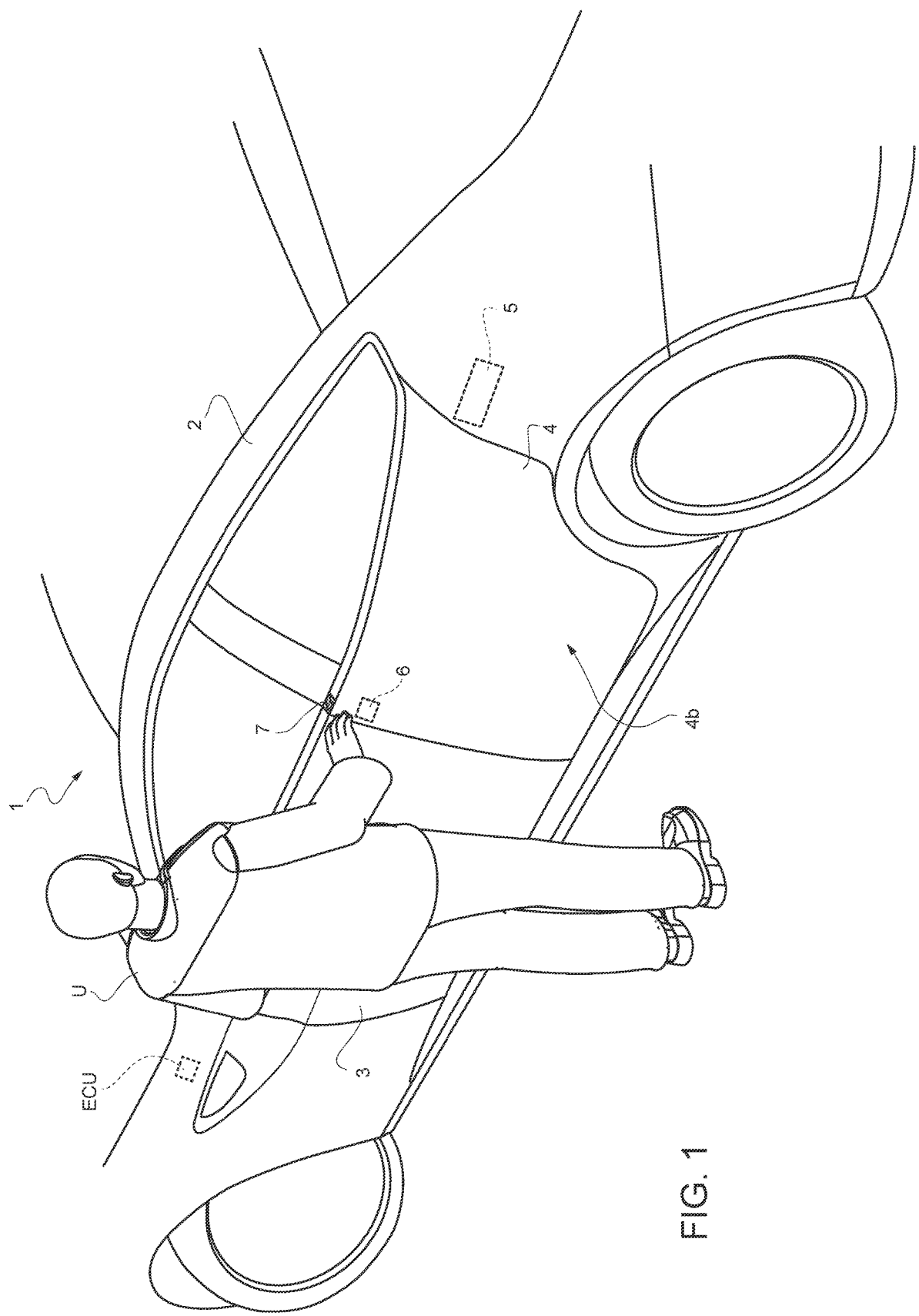
FIG. 1 is a perspective view of a motor vehicle according to the invention.

In FIG. 1, reference number 1 is used to indicate, as a whole, a motor vehicle.

The motor vehicle 1 comprises a body 2 and a plurality of side doors, in particular a front side door 3 and a rear side door 4.

Each one of the doors 3, 4 is hinged to the body 2 so that it can rotate around an axis towards a side of the vehicle, in particular the same side where the doors 3, 4 are located, i.e. the side where a user U is shown in FIG. 1. In other words, the axis is substantially vertical, meaning that the inclination of the axis relative to a vertical direction could range, for example, from 0° to 30°.

In FIG. 1, the doors 3, 4 are shown in a closed configuration. Each one of the doors 3, 4 can rotate between the closed configuration and an open configuration, for example a completely open configuration, like in FIG. 4.

Hereinafter, for brevity reasons, reference will be made to only one of the doors 3, 4, specifically the door 4, assuming that the information disclosed below could be applied, alternatively or in addition, to the door 3.

The motor vehicle 1 comprises an opening device 5, schematically shown in FIG. 1, to open the door 4.

The opening device 5 is motorized and is controllable to move the door 4 from the closed configuration towards the open configuration.

Furthermore, the opening device 5 also is conveniently controllable to close the door 4, namely to move the latter from the open configuration towards the closed configuration.

In other words, the opening device 5 moves the door 4 in an autonomous manner, namely without any intervention of the user U.

Besides the opening device 5, the motor vehicle 1 can also comprise a lock device 6 controllable to lock the door 4 in the closed configuration and to further unlock the door 4 locked in the closed configuration. For example, the lock device 6 could be controlled by the user U by means of a remote control not shown herein.

In order to operate the opening device 5, the motor vehicle 1 comprises a command receiving device 7, which is configured to receive an opening request command for the door 4 from the outside of the motor vehicle 1.

Figure 2:
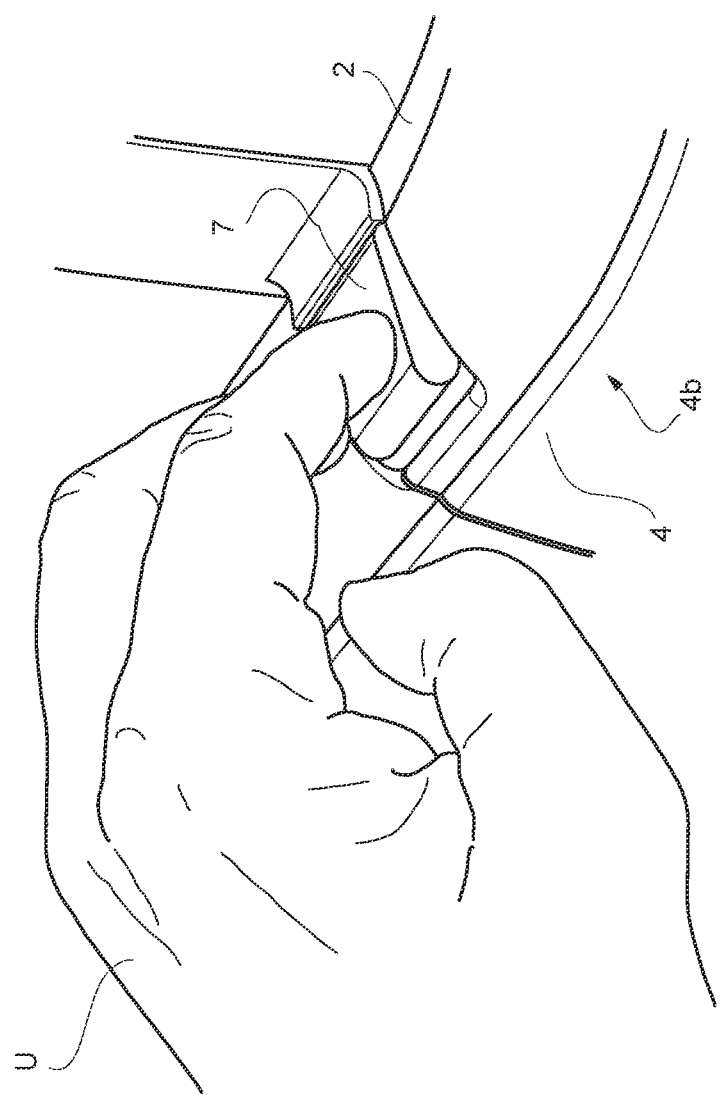
FIG. 2 shows, on a larger scale, a detail of the motor vehicle of FIG. 1.

Specifically, the device 7 comprise a member that be touched from the outside of the motor vehicle 1, for example a lever, which is well visible in FIG. 2. Alternatively, the touchable member could be a button or even a touch-sensitive surface, for example of the capacitive or inductive type or the like, or a heat-sensitive surface. The touchable member is preferably coupled to the body 2. Furthermore, the touchable member conveniently is separate from the door 4.

Hence, in this case, the opening request command comes from the user U, who touches the device 7, as shown in FIG. 2.

This is not limiting; as a matter of fact 7, the device could comprise an electromagnetic signal receiver. Therefore, the opening request command could be an electromagnetic signal, for example emitted by an electronic device, for example a remote control, a mobile phone and the like, according to a corresponding command of the user U.

The motor vehicle 1 further comprises a control unit ECU coupled to the devices 5, 7.

The control unit ECU is configured to control the opening device 5 in response to the opening request command received by the device 7, so that the door 4 rotates from the closed configuration towards the open configuration.

The control unit ECU can also be configured to control the opening device 5 so that the door 4 rotates in the opposite direction, namely from the open configuration towards the closed configuration, for example based on a closing request command coming from a suitable device non shown herein and coupled to the control unit ECU.

More precisely, the control unit ECU control the opening device 5 so that the door 4 reaches an intermediate configuration between the open—in particular, completely open—configuration and the closed configuration.

Figure 2A:
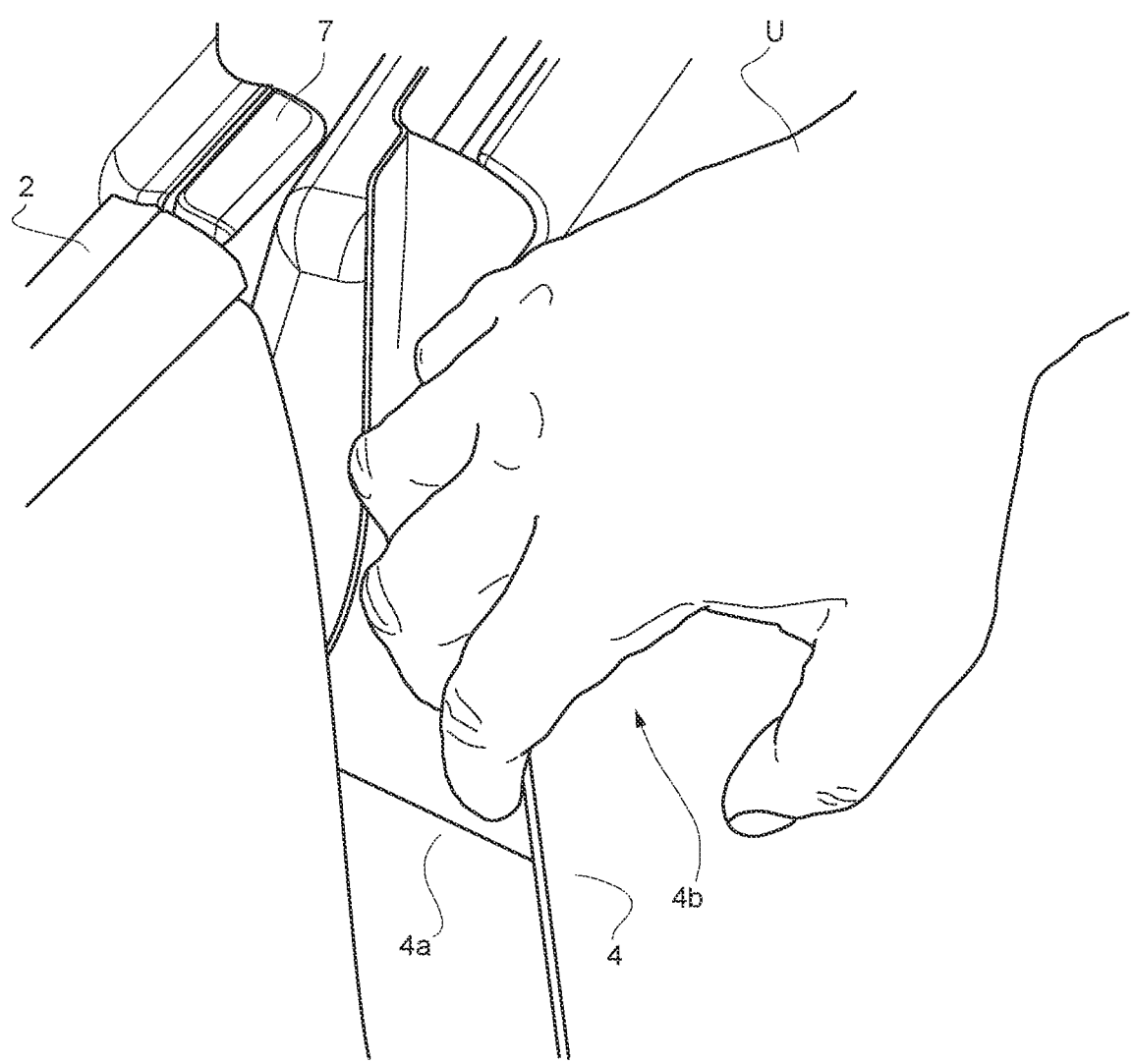
FIG. 2a is a further perspective view of an area of the motor vehicle comprising a door portion, in particular shown in an open presenter configuration.

This intermediate configuration is shown, in particular, in FIG. 2a. The intermediate configuration is a presenter configuration or, better said, an open presenter configuration, meaning that the door 4 is slightly open by an angle that is sufficient to expose to the user U the end 4a opposite the hinged one.

More precisely, from the closed configuration to the intermediate configuration, the door 4 rotates by an angle ranging from 2° to 20°, preferably of 5°.

In other words, as shown in FIG. 2a, the door 4 open in the intermediate configuration allows the user U to introduce a hand between the body 2 and the door 4, so that the user U can manually push or grab the door 4, more precisely the end 4a. By so doing, the user U can move the door 4 towards the open configuration.

In this way, the door 4 does not need any handle or graspable element, which allows the user U to move the door 4.

On the contrary, the door 4 externally lacks handles, graspable elements or graspable portions designed to allow or make it easier for the user to grasp the door 4 and/or rotate the door 4 from the closed configuration towards the open configuration.

For example, the door 4 has an outer surface 4b, which has no protuberances or recesses of any kind, which allow the user U the grasp the door, specifically from the outside of the motor vehicle 1. The user U can only lay or press a palm of the hand against the surface 4b. On the other hand, the user U cannot grab the door 4 and cannot introduce the fingers in a recess thereof.

The surface 4b looks like a continuous surface without corners. Furthermore, the surface 4b is continuous and flush with the body 2 or outer body of the motor vehicle 1.

The device 5 comprises a motor 10, for example an electric or hydraulic motor, controllable by the control unit ECU. In fact, the motor 10 is coupled to the control unit ECU. In other words, the motor 10 is a servo-motor.

The motor 10 could be a rotary motor or a linear motor.

In particular, the motor 10 comprises at least one casing or a portion carried by the body 2 in a fixed position relative to the body 2.

Furthermore, the device 5 comprises a pushing assembly 11 operable by the motor 10 to exert a thrust upon the door 4.

The pushing assembly 11 is conveniently carried by the body 2.

The pushing assembly 11 can be manufactured in many ways and can contain one or more transmissions, kinematic mechanisms, gears, articulated mechanisms designed to exert the thrust upon the door 4.

For example, the pushing assembly 11 could include a crank train mechanism configured to convert a rotary motion of the motor 10 into a translation motion exerting the thrust.

Furthermore, for example, the pushing assembly 11 could include one or more speed reduction devices, such as gears or a transmission with a flexible drive member, in particular including one or more pulleys and, for example, a belt wound around the pulleys.

The thrust exerted by the assembly 11 is transversal, more precisely orthogonal to the door 4. Furthermore, the assembly 11 exerts the thrust from the inside of the motor vehicle 1.

The thrust can be exerted both towards the outside and towards the inside of the motor vehicle 1, based on whether the device 5 is used to open or close the door 4, respectively. In order to avoid misunderstandings, the terms "open" and "close" mean moving the door 4 towards the open and closed configuration, respectively.

The assembly 11 comprises at least one pushing portion 12, which is movable, through translation, along a straight axis or direction A, specifically parallel to the forward moving direction of the motor vehicle 1 or parallel to the direction of extension of the door 4 in the closed configuration.

The pushing portion 12 is carried by the body 2 in a movable manner, through translation, along the axis A. In other words, the portion is constrained relative to the body 2 with at least one degree of freedom of translation relative to the body 2. Still in other words, the pushing portion 12 translates, namely relative to the body 2 along the axis A.

In particular, the axis A is fixed relative to the body 2.

Furthermore, the assembly 11 preferably comprises a transmission, for example a crank train mechanism in case the motor 10 is a rotary motor or a straight rod in case the motor is a linear motor, configured to transmit an output of the motor 10, for example a torque or an output speed thereof, to the pushing portion 12, so that the latter translates in response to the output of the motor 10.

By translating, the pushing portion 12 exerts the transversal thrust upon the door 4.

More in detail, the pushing portion 12 exerts the thrust by means of an arm 14, which is coupled to the door 4 and to the pushing portion 12.

More precisely, the arm 14 is fixed to the door 4.

In particular, the assembly 11 comprises a structure 15 to which the arm 14 is hinged. More in particular, the structure 15 is fixed relative to the body 2.

The pushing portion 12 is preferably carried by the structure 15.

The arm 14 comprises an end 14a fixed to the door 4 and an end 14b hinged to the structure 15 around a hinge axis B transversal, more precisely orthogonal to the direction A.

The coupling of the pushing portion 12 to the arm 14 is such that the translation of the pushing portion 12 along the direction A causes the rotation of the arm 14 around the axis B.

Namely, the arm 14 rotates in response to the translation of the pushing portion 12.

For example, the pushing portion 12 can be fixed to the arm 14.

The pushing portion 12 is coupled to the arm 14 in an intermediate position between the ends 14a, 14b.

Therefore, by translating along the direction A, the pushing portion 12 pushes the arm 14 at the intermediate position. By so doing, the arm 14 rotates around the axis B, thus pushing the door 4.

The arm 14 preferably has a curved or hook-like shape. In other words, the shape of the arm 14 is such that the thrust of the pushing portion 12 along the axis A in the area of the intermediate portion corresponds to a transversal thrust exerted upon the door 4 in the area of the end 14a.

Figure 3:
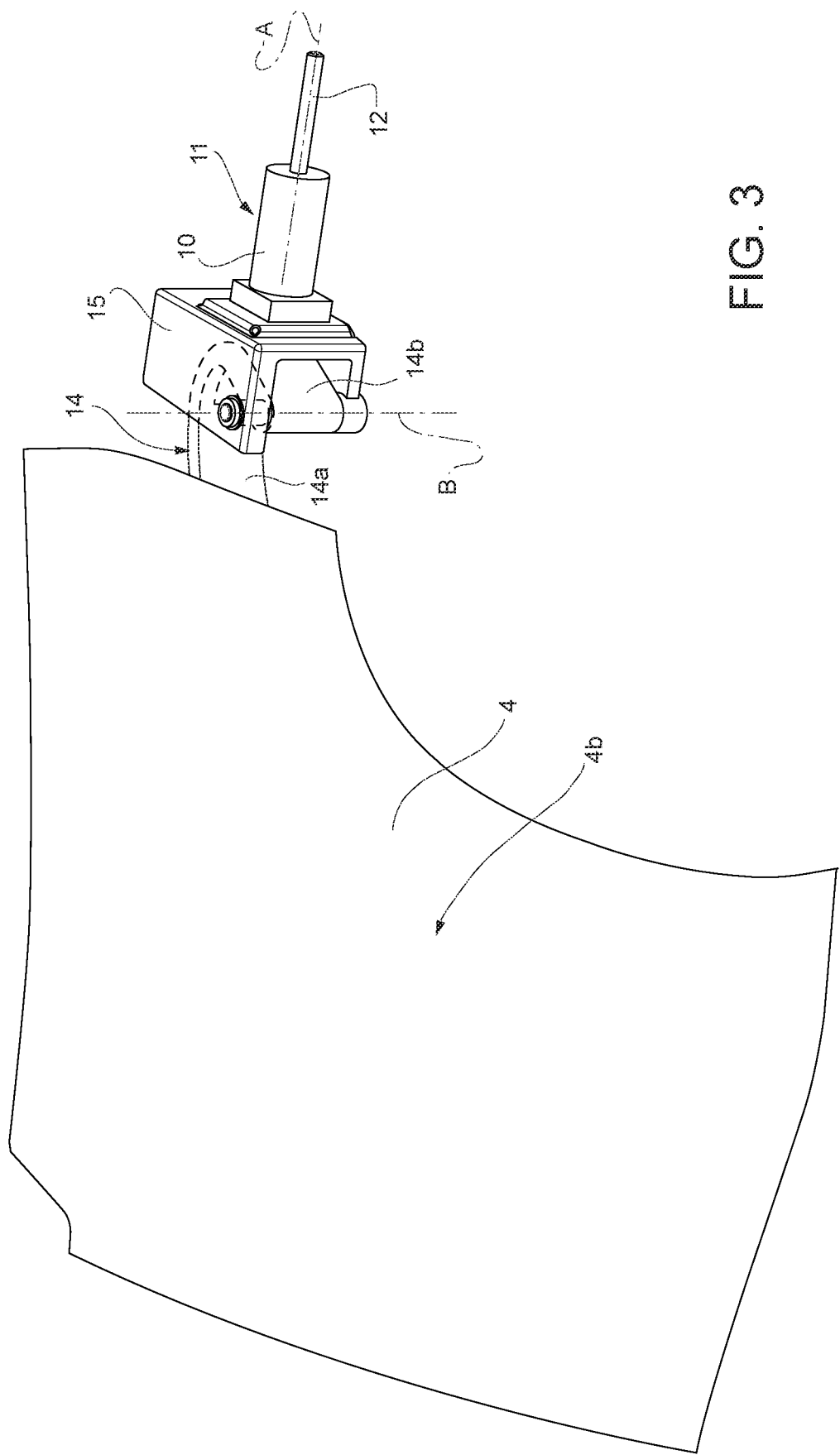
FIGS. 3 and 4 are further perspective views of the door, in a closed and open configuration respectively, specifically completely open.
Figure 4:
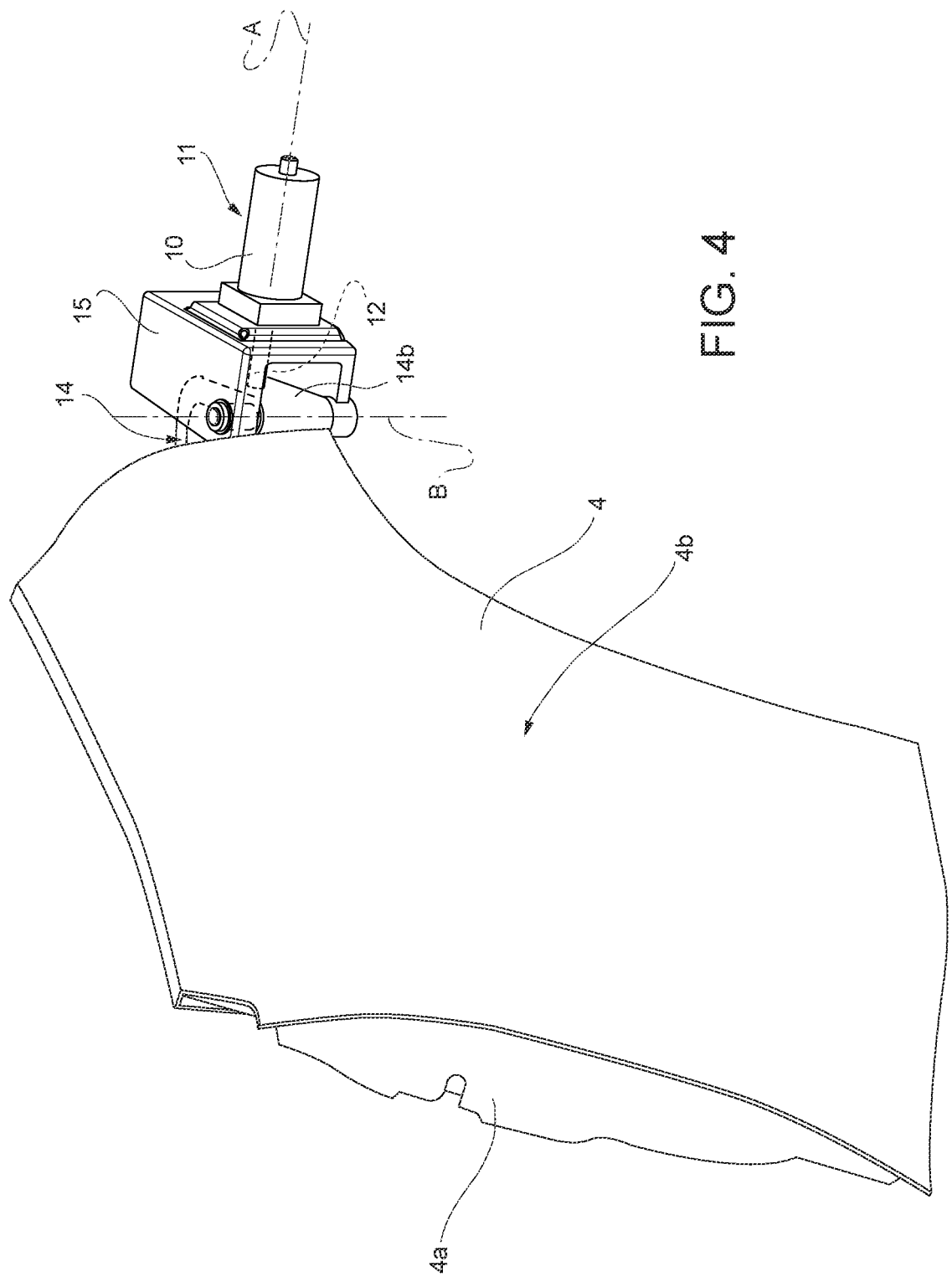

The operation of the motor vehicle 1 is described by FIGS. 3 and 4.

In FIG. 3, the door 4 is in the closed configuration. When the user U or a suitable electronic device issues the opening request command, the device 7 receives the opening request command.

At this point, the control unit ECU identifies the receipt of the opening request command and controls the opening device 5.

The opening device 5 is controlled so as to move the door 4 to the intermediate presenter configuration. Then, the user U can move the door 4 until it reaches the open configuration, which is shown in FIG. 4.

The opening device 5 does not prevent the opening configuration from being reached, as shown in FIG. 4. Indeed, the pushing portion 12 can keep translating from a position corresponding to the intermediate presenter configuration towards a position corresponding to the open configuration and vice versa.

The control unit ECU can even control the opening device 5 so as to move the door 4 to the open—more precisely, completely open—configuration by means of the motor 10, without interventions of the user U.

Hence, the opening device 5 controlled by the control unit ECU can accompany the movement of the door 4 pushed by the user U, specifically through the motor 10.

The closing of the door 4 can take place by means of the opening device 5 in a reverse manner compared to the opening of the door 4.

Namely, the control unit ECU can control the opening device 5 so as to close the door 4.

The closing of the door 4, in a reverse manner relative to the opening of the door 4, could also be considered in an independent manner relative to the opening of the door 4. In other words, the control unit ECU could control the opening device 5 so as to close the door 4 in an independent manner relative to the control of the opening device 5 to open the door 4.

During the closing, the motor 10 can be controlled so as to adjust the closing speed of the door 4. For example, the control unit ECU can control the motor 10 so that the closing speed of the door 4 is limited by a maximum value, which can be predetermined or selected by the user U. For example, the order of magnitude of the maximum value is 0.8 rad/s.

In particular, the control unit ECU can control a gradual closing of the door 4 by means of the opening device 5, without intervention of the user U, especially from the intermediate presenter configuration towards the closed configuration.

Hence, the closing could take place in two distinct and independent times: a first movement from the opening configuration to the intermediate presenter configuration and a second movement from the intermediate presenter configuration to the closed configuration.

Owing to the above, the advantages of the motor vehicle 1 according to the invention are evident.

The opening and, if necessary, the closing of the door 4 take place in an extremely simple and safe fashion, as well as in a semi-automatic manner.

The lack of handles or apprehensible portions on the surface 4b is advantageous both in aesthetic terms and in technical terms. In particular, the aerodynamic of the motor vehicle 1 benefits from this lack. Furthermore, theft-related safety is increased as well. In addition, the shape of the door 4 is necessarily simplified.

Finally, the motor vehicle 1 according to the invention can be subjected to changes and variants, which, though, do not go beyond the scope of protection set forth in the appended claims.

The invention claimed is:

1. A motor vehicle comprising:
a body,
a side door hinged to the body in a manner to be rotatable about an axis towards a side of the motor vehicle between a closed configuration and an open configuration;
a motorized device, which is controllable to move the door from the closed configuration towards the open configuration and from the open configuration towards the closed configuration;
command receiving means to receive an opening request command for the door from the outside of the motor vehicle or a closing request command; and
a control unit configured to control the motorized device so that the door rotates from the closed configuration towards the open configuration in response to the opening request command and from the open configuration towards the closed configuration in response to the closing request command;
wherein the motorized device comprises:
a motor controllable by the control unit; and
a pushing assembly operable by the motor to exert a transversal thrust upon the door;
wherein the pushing assembly comprises a transmission configured to transmit an output of the motor to at least one thrust portion so that the thrust portion translates in response to the output of the motor, thereby exerting said thrust;
wherein the pushing assembly comprises a structure fixed to the vehicle body, and an arm, the arm comprising a first end, which is fixed to the door; and a second end, which is hinged to the structure about a hinge axis transversal to a straight direction such that the hinge axis is fixed to the body,
wherein the thrust portion is coupled to the arm at an intermediate position between the first end and the second end of the arm so that the arm rotates in response to a translation in the straight direction of the thrust portion, and
wherein the thrust exerted by the thrust portion via the arm is a lateral thrust upon the side door.

2. The motor vehicle according to claim 1, wherein the door externally lacks apprehensible portions suitable for allowing a user to grasp the door and consequently rotate the door from the closed configuration towards the open configuration.

3. The motor vehicle according to claim 1, wherein the control unit is configured to control the motorized device in response to the opening request command so that the door rotates from the closed configuration to an intermediate presenter configuration between the open configuration and the closed configuration.

4. The motor vehicle according to claim 1, wherein the command receiving means comprise a member being touchable from the outside of the motor vehicle.

5. The motor vehicle according to claim 1, wherein the command receiving means comprise an electromagnetic signal receiver.

6. The motor vehicle according to claim 1, wherein the arm has a curved shape.

7. The motor vehicle according to claim 1, wherein the straight direction (A) substantially extends along a forward moving direction of the motor vehicle (1).

8. A motor vehicle comprising:
a body,
a side door hinged to the body in a manner to be rotatable about an axis towards a side of the motor vehicle between a closed configuration and an open configuration;
a motorized device, which is controllable to move the door from the closed configuration towards the open configuration and from the open configuration towards the closed configuration;
command receiving means to receive an opening request command for the door from the outside of the motor vehicle or a closing request command; and
a control unit configured to control the motorized device so that the door rotates from the closed configuration towards the open configuration in response to the opening request command and from the open configuration towards the closed configuration in response to the closing request command;
wherein the motorized device comprises:
a motor controllable by the control unit; and
a pushing assembly operable by the motor to exert a transversal thrust upon the door;
wherein the pushing assembly comprises a transmission configured to transmit an output of the motor to at least one thrust portion so that the thrust portion translates in response to the output of the motor, thereby exerting said thrust;
wherein the pushing assembly comprises a structure fixed to the vehicle body, and an arm, the arm comprising a first end, which is fixed to the door; and a second end, which is hinged to the structure about a hinge axis transversal to a straight direction such that the hinge axis is fixed to the body,
wherein the thrust portion is fixed to the arm at an intermediate position between the first end and the second end of the arm so that the arm rotates in response to a translation in the straight direction of the thrust portion, and
wherein the thrust exerted by the thrust portion via the arm is a lateral thrust upon the side door.

* * * * *